3,189,602
PROCESS FOR THE PRODUCTION OF 1,4-BENZODIAZEPINES
Heinz M. Wuest, New York, N.Y., assignor to Warner-Lambert Pharmaceutical Company, Morris Plains, N.J., a corporation of Delaware
No Drawing. Filed Mar. 27, 1964, Ser. No. 356,013
5 Claims. (Cl. 260—239)

This invention relates to 1,4-benzodiazepines. More particularly, this invention relates to a novel process for the production of 1,4-benzodiazepines of the formula:

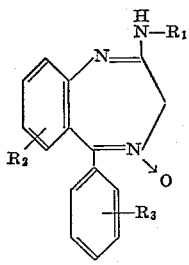

wherein $R_1$ represents lower alkyl such as methyl, ethyl, propyl or isobutyl, and $R_2$ and $R_3$ each represent hydrogen, halogen such as chlorine and bromine, lower alkyl such as methyl, ethyl or propyl and lower alkoxy such as methoxy or ethoxy. The symbols $R_1$, $R_2$ and $R_3$ as used hereinafter have the same meaning as defined.

The above compounds are important therapeutic agents. They are useful, for example, as tranquilizers. In addition, they are important intermediates for the production of other 1,4-benzodiazepines.

This application is a continuation-in-part application of my copending application, Serial No. 204,301, filed April 9, 1962, now U.S. Patent 3,138,586.

In accordance with my invention the above compounds are synthesized by reacting an intermediate compound represented by the following structural formula:

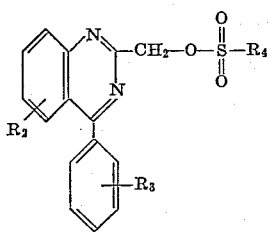

wherein $R_4$ represents a lower alkyl group such as methyl, ethyl or propyl or an aryl group such as phenyl or tolyl with an excess of primary aliphatic amine of the formula $R_1NH_2$.

Suitable amines useful for this reaction are, for example, methylamine, ethylamine, propylamine, isobutylamine and the like.

The reaction is generally effected at ambient temperature such as 25° to 30° C. over a period of about 12 to 18 hours. The precipitated reaction product may be recovered from the reaction medium by conventional means such as by filtration or centrifugation. The starting intermediate useful for this reaction is described and claimed in copending application Serial No. 305,503.

The foregoing reaction may be conveniently expressed in the following equation:

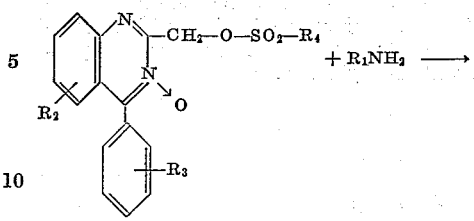

The following example is included in order further to illustrate the invention.

Example 1

To a solution of 5.9 g. of methylamine in 29.5 ml. of methanol is added 2 g. of 2-mesyloxymethyl-4-phenyl-6-chloroquinazoline-3-oxide and the resulting thick paste is allowed to stand for 12–18 hours at a temperature of 25°–27° C. The 7-chloro-2-methylamino-5-phenyl-3H-1,4-benzodiazepine-4-oxide formed is removed by filtration, and the mother liquor concentrated further to yield a second crop. The combined products are then recrystallized from methanol. The purified compound melts at 238.5°–240.5° C.

It is understood that the foregoing detailed description is given merely by way of illustration and that many variations may be made therein without departing from the spirit of my invention.

Having described my invention, what I desire to secure by Letters Patent is:

I claim:

1. Process for the production of a compound of the formula:

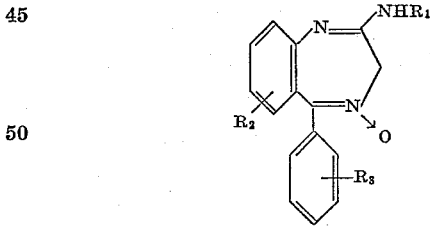

wherein $R_1$ is lower alkyl, and $R_2$ and $R_3$ is each a member of the group consisting of hydrogen, lower alkyl, halogen, and lower alkoxy which comprises reacting an intermediate of the formula:

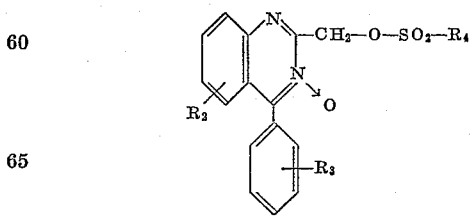

in which $R_4$ is a member of the group consisting of lower alkyl and aryl with an amine of the formula $R_1NH_2$.

2. Process according to claim 1 wherein said intermediate compound is 2-mesyloxymethyl-4-phenyl-6-chloro-quinazoline-3-oxide.

3. Process according to claim 1 wherein said intermediate compound is 2-tosyloxymethyl-4-phenyl-6-chloro-quinazoline-3-oxide.

4. Process according to claim 1 wherein said amine is methylamine.

5. Process for the production of 7-chloro-2-methylamino-5-phenyl-3H-1,4-benzodiazepine-4-oxide which comprises reacting 2-mesyloxymethyl-4-phenyl-6-chloro-quinazoline-3-oxide with methylamine.

References Cited by the Examiner
UNITED STATES PATENTS 2,893,992 7/59 Sternbach _____ 260—239

OTHER REFERENCES

Houben-Weyl: Methoden Der Organischen Chemie, Vol. 11/1 (Stuttgart, 1957), pages 26 and 217–220.

Wagner et al.: Synthetic Organic Chemistry (New York, 1953), pages 666—668.

NICHOLAS S. RIZZO, *Primary Examiner.*

WALTER A. MODANCE, *Examiner.*